US012454130B2

(12) United States Patent
Hishida et al.

(10) Patent No.: US 12,454,130 B2
(45) Date of Patent: Oct. 28, 2025

(54) MAINTENANCE LIQUID AND MAINTENANCE METHOD

(71) Applicant: SEIKO EPSON CORPORATION, Tokyo (JP)

(72) Inventors: Yuko Hishida, Matsumoto (JP); Miki Uchida, Matsumoto (JP); Yusuke Mizutaki, Shiojiri (JP); Hiromichi Takanashi, Shiojiri (JP); Tomohiro Kawasaki, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 189 days.

(21) Appl. No.: 18/456,697

(22) Filed: Aug. 28, 2023

(65) Prior Publication Data

US 2024/0066874 A1 Feb. 29, 2024

(30) Foreign Application Priority Data

Aug. 29, 2022 (JP) ................................ 2022-135975

(51) Int. Cl.
*B41J 2/165* (2006.01)
*C11D 3/43* (2006.01)

(52) U.S. Cl.
CPC ....... *B41J 2/16552* (2013.01); *B41J 2/16535* (2013.01); *B41J 2/165* (2013.01); *B41J 2002/16558* (2013.01); *C11D 3/43* (2013.01)

(58) Field of Classification Search
CPC .... B41J 2/16552; B41J 2/16535; B41J 2/165; B41J 2002/16558; C11D 3/43
See application file for complete search history.

(56) References Cited

U.S. PATENT DOCUMENTS 10,099,479 B2 * 10/2018 Okuda ................ B41J 2/16552

FOREIGN PATENT DOCUMENTS

JP 2010-089404 A 4/2010

* cited by examiner

*Primary Examiner* — Geoffrey S Mruk
(74) *Attorney, Agent, or Firm* — Harness, Dickey & Pierce, P.L.C.

(57) ABSTRACT

A maintenance liquid is used to maintain an ink jet head of a printing apparatus configured to eject an ink for printing from the ink jet head. The maintenance liquid is aqueous and subject to detection by a conductivity-based sensor. The maintenance liquid includes at least one selected from the group consisting of inorganic alkalis and ethylenediaminetetraacetic acid compounds and at least one selected from the group consisting of organic acids and organic alkalis. The maintenance liquid has an electrical conductivity of 100 μS/cm or more and a pH of 6.0 to 11.

15 Claims, 1 Drawing Sheet

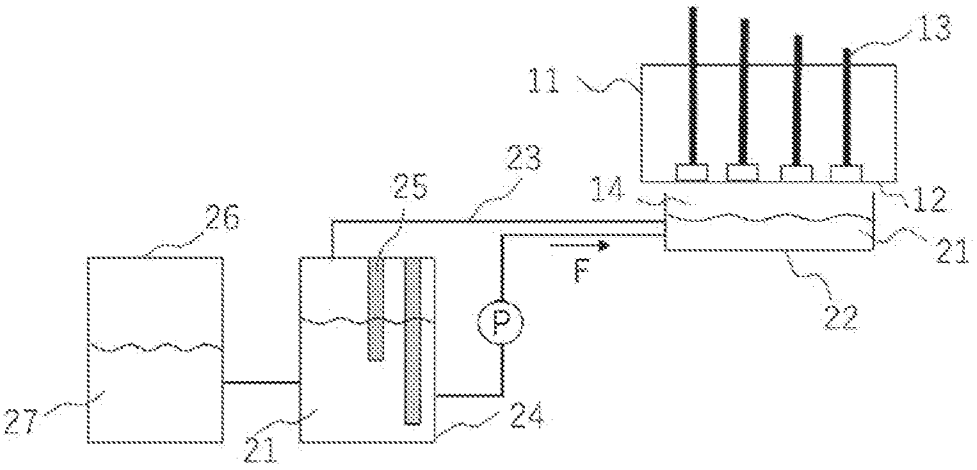
13
11
23
25
14
12
26
21
F
22
P
27
21
24

MAINTENANCE LIQUID AND MAINTENANCE METHOD

The present application is based on, and claims priority from JP Application Serial Number 2022-135975, filed Aug. 29, 2022, the disclosure of which is hereby incorporated by reference herein in its entirety.

BACKGROUND

1. Technical Field

The present disclosure relates to a maintenance liquid and a maintenance method.

2. Related Art

Ink jet printing methods, which enable high-definition image printing with a relatively simple apparatus, have been rapidly developed in various fields. In this context, studies on head maintenance have been conducted from various viewpoints. To provide a highly preservative maintenance liquid that can reduce the corrosion of capping device members, for example, JP-A-2010-89404 discloses a maintenance liquid used in printing apparatuses that include a head to eject ink, a capping device configured to cover the head for moisturization, and a maintenance liquid feed device configured to supply the maintenance liquid to the capping device. The maintenance liquid at least contains water, a water-soluble coloring agent, a pH adjuster, and a water-soluble organic solvent selected from the group consisting of alkanediols and alkylene glycol monoether derivatives.

Printing apparatuses provided with a maintenance liquid include a tank in which the maintenance liquid is held. The maintenance liquid is gradually reduced by use, evaporation, and so on. Accordingly, in some cases, a conductivity-based sensor for measuring the electrical conductivity of the maintenance liquid is used to detect the state of the remaining maintenance liquid and determine the presence or absence of the maintenance liquid. Unfortunately, conductivity-based sensors are less likely to detect the maintenance liquid, and maintenance liquids do not exhibit performance sufficient for maintenance.

SUMMARY

Accordingly, the present disclosure provides a maintenance liquid used to maintain an ink jet head of a printing apparatus configured to eject ink for printing from the ink jet head. The maintenance liquid is aqueous and subject to detection by a conductivity-based sensor. The maintenance liquid includes at least one selected from the group consisting of inorganic alkalis and ethylenediaminetetraacetic acid compounds, and at least one selected from the group consisting of organic acids and organic alkalis and has an electrical conductivity of 100 μS/cm or more and a pH of 6.0 to 11.

The present disclosure provides a maintenance method including maintaining an ink jet head using the maintenance liquid and detecting the electrical conductivity of the maintenance liquid with a conductivity-based sensor.

The present disclosure provides a printing apparatus including the maintenance liquid, an ink jet head subject to maintenance with the maintenance liquid, and a conductivity-based sensor configured to detect the electrical conductivity of the maintenance liquid. The present disclosure provides an ink set including the maintenance liquid and an ink.

BRIEF DESCRIPTION OF THE DRAWING

FIGURE is a schematic diagram of the configuration around a maintenance liquid of a printing apparatus.

DESCRIPTION OF EMBODIMENT

An embodiment of the present disclosure (hereinafter, referred to as the "embodiment") will now be described in detail with reference to the drawing as needed. However, the present disclosure is not limited to the embodiment disclosed herein, and various modifications may be made without departing from the scope and spirit of the disclosure. The same elements in the drawing are designated by the same reference numerals, and thus description thereof is omitted. The up-down, right-left, and other positional relationships are in accordance with the drawing unless otherwise specified. The dimensional proportions in the drawing are not limited to those illustrated in the drawing.

1. Maintenance Liquid

The maintenance liquid of the embodiment is used to maintain an ink jet head of a printing apparatus configured to eject ink for printing from the ink jet head. The maintenance liquid is aqueous and subject to detection by a conductivity-based sensor. The maintenance liquid contains at least one selected from the group consisting of inorganic alkalis and ethylenediaminetetraacetic acid compounds and at least one selected from the group consisting of organic acids and organic alkalis and has an electrical conductivity of 100 μS/cm or more and a pH of 6.0 to 11.

A maintenance liquid is used to maintain an ink jet head of a printing apparatus configured to eject ink for printing from the ink jet head and is aqueous and subject to detection by a conductivity-based sensor.

A printing apparatus provided with a maintenance liquid includes a tank in which the maintenance liquid is held. The maintenance liquid is gradually reduced by use, evaporation, and so on. Accordingly, a sensor is desired to detect the state of the remaining maintenance liquid. The sensor may be a conductivity-based sensor operable to measure the electrical conductivity of the maintenance liquid and determine the presence or absence of the maintenance liquid or an optical sensor. Unfortunately, optical sensors are expensive and cannot easily detect the maintenance liquid unless the maintenance liquid is colored. Thus, using conductivity-based sensors is desired. Accordingly, a maintenance liquid detectable with conductivity-based sensors and exhibiting high performance as a maintenance liquid is desired.

FIGURE schematically depicts an example of the peripheral configuration to use a maintenance liquid in a printing apparatus. As depicted in FIGURE, the printing apparatus ejects ink from an ink jet head 11 through ink flow paths 13. The ink jet head 11 has a nozzle face 12 at which a plurality of nozzles is provided to eject ink through the nozzles. The ink is fed to the ink flow paths 13 from an ink container (not shown) located, for example, upstream.

The tank 24 holds a maintenance liquid 21. When the printing apparatus is used after being installed, a maintenance liquid 21 is newly supplied to the tank 24 from a maintenance liquid container (not shown) or the like and held in the tank 24, thus used in the printing apparatus for maintenance. The maintenance liquid container holds the newly supplied maintenance liquid before use and supplies the maintenance liquid to the tank 24 of the printing apparatus and may be, for example, a maintenance liquid package.

The nozzle face 12 of the ink jet head 11 may be covered with a cap 22 when maintained. The maintenance liquid 21 is fed to the cap 22 covering the nozzle face 12 of the ink jet head 11 from the tank 24 to moisturize the nozzle face 12. In this instance, the maintenance liquid 21 runs through a flow path 23 in direction F, thus being fed to the cap 22.

The nozzle face 12 and the cap 22 may define a closed space 14 so that the maintenance liquid 21 moisturizes the closed space 14 without contact with the nozzle face 12. In this instance, the closed space 14 may or may not be hermetically enclosed. In some embodiments, the closed space 14 is hermetically enclosed. Such a closed space 14 enables the maintenance liquid 21 to moisturize the closed space 14 without contacting the ink.

Thus, the moisturized air in the closed space 14 moisturizes the nozzles at the nozzle face of the ink jet head 11, preventing the ink in the nozzles from drying, thickening, and solidifying. Thus, the ink jet head 11 is maintained.

While the nozzle face 12 is being moisturized, the maintenance liquid 21 may splash in or leak from the closed space 14 and unexpectedly attach to the nozzle face 12, coming into contact with the ink. Even in this case, the maintenance liquid 21 of the embodiment can reduce the likelihood that ink constituents form clumps. In an embodiment, an impermeable film may be provided over the maintenance liquid in the cap 22 to prevent the maintenance liquid from contacting the nozzle face (but allowing permeation of evaporated component).

After maintenance, the maintenance liquid 21 fed to the cap 22 may return to the maintenance liquid tank 24 through the flow path 23. Thus, the maintenance liquid 21 can be repeatedly used for each maintenance. Also, the maintenance liquid 21 may be kept from being in a place other than the tank 24 when it is not used.

The maintenance liquid 21 can gradually decrease since it spills from the cap 22, used portions are rejected, or water evaporates from the maintenance liquid 21 during moisturizing with repeated use. In such a case, the amount of the maintenance liquid 21 in the tank 24 can be estimated by measurement with a conductivity-based sensor 25.

Also, when the amount of the maintenance liquid 21 decreases by evaporation, substances less likely to evaporate may be used as components A and B to reduce the decrease of the maintenance liquid and thus reduce pH changes. Unfortunately, this approach may cause only water to evaporate, concentrating the components. Accordingly, in an embodiment, the apparatus may include a mechanism configured to add water to the maintenance liquid and mix the water with the maintenance liquid to dilute the maintenance liquid, thus preventing the concentration of the maintenance liquid (recovering the maintenance liquid from the concentration). For example, when the amount of the maintenance liquid 21 decreases to some extent, water 27 may be supplied to the tank 24 from a water tank 26.

The use of the maintenance liquid is not limited to the above, and the maintenance liquid may be used as, for example, a cleaning liquid to pass through the ink jet head, ink supply paths, and the like or to be attached to the nozzle face or the like for cleaning, or another cleaning liquid (wiping liquid) that is attached to the nozzle face and wiped away with a wiper.

In other words, the maintenance of a printing apparatus using the maintenance liquid is not limited to moisturizing the nozzle face and may be, for example, cleaning the nozzle face by attaching the maintenance liquid to the nozzle face or cleaning the insides of the ink jet head and ink flow paths by passing the maintenance liquid through those devices or members. The maintenance liquid of the embodiment excels in reducing foreign matter derived from, for example, clumps of ink constituents even when the maintenance liquid comes into contact with ink during such maintenance and is thus useful.

The sensor 25 may be provided, for example, in the maintenance liquid tank 24, which holds and supplies the maintenance liquid, or in the cap 22, a maintenance liquid supply tube channel, or a maintenance liquid container. The composition of the maintenance liquid will now be described. When the composition of a maintenance liquid is mentioned, the maintenance liquid refers to that newly supplied to a tank of a printing apparatus from a maintenance liquid container or the like unless otherwise specified.

1. 1. Inorganic Alkali and Ethylenediaminetetraacetic Acid Compound (Component A)

The maintenance liquid of the embodiment contains at least one either an inorganic alkali or an ethylenediaminetetraacetic acid compound and may contain both. In the following description, inorganic alkalis and ethylenediaminetetraacetic acid compounds may be collectively referred to as component A.

Component A increases the electrical conductivity of the maintenance liquid and is solid at room temperature. Component A, therefore, does not evaporate with time during the use of the maintenance liquid and is likely to keep the electrical conductivity high. Additionally, ethylenediaminetetraacetic acid compounds function to adjust pH and are thus desirable.

Exemplary inorganic alkalis include, but are not limited to, lithium hydroxide, sodium hydroxide, and potassium hydroxide.

Exemplary ethylenediaminetetraacetic acid compounds include, but are not limited to, disodium dihydrogen ethylenediaminetetraacetate, tetrasodium ethylenediaminetetraacetate, ethylenediaminetetraacetic acid, and compounds produced by substituting potassium for the sodium of the above sodium salts.

The total amount of component A may be 0.01% by mass or more relative to the total mass of the maintenance liquid and is, for example, 0.03% by mass or more, 0.05% by mass or more, or 0.07% by mass or more. Also, the total amount of component A may be 0.2% by mass or less relative to the total mass of the maintenance liquid and is, for example, 0.1% by mass or less, 0.09% by mass or less, or 0.08% by mass or less.

When the total amount of component A is 0.01% by mass or more, the sensor can detect the maintenance liquid more sensitively, and the change with time in the composition tends to be reduced. Also, when the total amount of component A is 0.2% by mass or less, the maintenance liquid tends to be less likely to attack the printing apparatus.

1. 2. Organic Acid and Organic Alkali (Component B)

The maintenance liquid of the embodiment contains at least one either an organic acid or an organic alkali and may contain both. Organic acids and organic alkalis may be collectively referred to as component B.

When containing component A, the maintenance liquid can have an excessively high or low pH and may cause a problem of attacking some apparatus members. Also, when the maintenance liquid with an excessively high or low pH contacts ink, some ink constituents can be changed into foreign matter. Such foreign matter occurs in the ink flow paths (including those in the head) and the waste flow path, clogging the flow paths and causing ejection failure. The foreign matter can mix with the ink in the waste tank, causing tank clogging.

Accordingly, the maintenance liquid of the embodiment uses component B. Component B facilitates the pH adjustment of maintenance liquid in a predetermined range, particularly reducing the likelihood that a slight difference in component A content causes pH changes. Additionally, component B is likely to reduce changes in pH with time to keep the pH in a predetermined range. In particular, solid component B does not evaporate over time, thus being likely to keep the pH in a predetermined range.

Examples of the organic acid include, but are not limited to, carboxylic acids, such as formic acid, acetic acid, citric acid, oxalic acid, 2-nitrophenylacetic acid, 2-ethylhexanoic acid, dodecanoic acid, 2-hydroxy-1,2,3-propanetricarboxylic acid, and adipic acid; sugar acids, such as ascorbic acid, tartaric acid, and glucuronic acid; sulfonic acids, such as benzenesulfonic acid and p-toluenesulfonic acid. In some embodiments, a carboxylic acid, particularly a dicarboxylic acid, may be used.

Examples of the organic alkali include, but are not limited to, alkanolamines, such as monoethanolamine, diethanolamine, triethanolamine, monoisopropanolamine, diisopropanolamine, and triisopropanolamine; and other organic amines, such as 2-amino-2-methyl-1-propanol, 2-amino-2-methyl-1,3-propanediol, and guanidine. In some embodiments, an alkanolamine with the hydroxy group and the amino group on the alkane skeleton may be used. In particular, a tertiary alkanolamine may be used.

In some embodiments, at least one of the organic acids and the organic alkalis is solid at 25° C. Adipic acid is a typical substance of such organic acids or organic alkalis. Such an organic acid or an organic alkali tends to reduce the change with time in the composition.

The total amount of component B may be 0.01% by mass or more relative to the total mass of the maintenance liquid and is, for example, 0.02% by mass or more. Also, the total amount of component B may be 0.5% by mass or less relative to the total mass of the maintenance liquid and is, for example, 0.45% by mass or less, 0.4% by mass or less, 0.35% by mass or less, or 0.3% by mass or less.

When the total amount of component B is 0.01% by mass or more, the sensor can detect the maintenance liquid more sensitively, and the change with time in the composition tends to be reduced. Also, when the total amount of component B is 0.5% by mass or less, the maintenance liquid tends to be less likely to attack the printing apparatus.

1. 3. Water-Soluble Organic Compound

The maintenance liquid of the embodiment may further contain a water-soluble organic compound. The water-soluble organic compound is not included in component A or B.

The water-soluble organic compound may be, but is not limited to, an organic solvent, a moisturizing agent that is not an organic solvent, or a surfactant. The organic solvent may be a polyol or a monool.

Examples of the monool include, but are not limited to, glycol monoalkyl ethers, such as ethylene glycol monomethyl ether, diethylene glycol monomethyl ether, triethylene glycol monomethyl ether, diethylene glycol monoethyl ether, diethylene glycol monobutyl ether, and triethylene glycol monobutyl ether.

Examples of the polyol include, but are not limited to, glycerin; and glycols, such as ethylene glycol, diethylene glycol, triethylene glycol, propylene glycol, dipropylene glycol, tripropylene glycol, propanediol, butanediol, pentanediol, and 1,2-hexanediol.

The moisturizing agent that is not an organic solvent may be a moisture-retentive organic compound that is solid by itself at room temperature, for example, a compound with two or more hydroxy groups in the molecule.

In some embodiments, a polyol, which is an organic solvent, may be used as the water-soluble organic compound. Such a water-soluble organic compound tends to reduce the change with time in the composition of the maintenance liquid and to further reduce the likelihood of clogging the waste flow path.

The amount of the water-soluble organic compound may be 1.0% by mass or more relative to the total mass of the maintenance liquid and is, for example, 3.0% by mass or more, 5.0% by mass or more, 10% by mass or more, 15% by mass or more, or 20% by mass or more. Also, the amount of the water-soluble organic compound may be 30% by mass or less relative to the total mass of the maintenance liquid.

Such an amount of the water-soluble organic compound tends to reduce the change with time in the composition of the maintenance liquid and to further reduce the likelihood of clogging the waste flow path.

1. 4. Preservative

In an embodiment, the maintenance liquid may further contain a preservative. The preservative tends to reduce the likelihood of clogging the waste flow path.

Examples of the preservative include, but are not limited to, paraoxybenzoic acid esters (such as methylparaben, sodium methylparaben, ethylparaben, benzylparaben, butylparaben, isobutylparaben, propylparaben, and isopropylparaben), chlorobutanol, benzyl alcohol, 2-phenylethylalcohol, dehydroacetic acid, sorbic acid, sodium benzoate, and 1,2-benzothiazolin-3-one. Such preservatives may be used individually or in combination.

The amount of the preservative may be 0.1% by mass or more relative to the total mass of the maintenance liquid and is, for example, 0.2% by mass or more. Also, the amount of the preservative may be 1.0% by mass or less relative to the total mass of the maintenance liquid and is, for example, 0.75% by mass or less or 0.5% by mass or less.

1. 5. Water

The maintenance liquid of the embodiment is an aqueous liquid containing water. Aqueous in relation to a composition denotes a composition containing water as one of the major constituents. The water content may be 55% by mass or more relative to the total mass of the maintenance liquid and is, for example, 60% by mass or more, 65% by mass or more, or 70% by mass or more. Also, the water content may be 99% by mass or less relative to the total mass of the maintenance liquid and is, for example, 90% by mass or less, 85% by mass or less, or 80% by mass or less.

1. 6. Electrical Conductivity

The electrical conductivity of the maintenance liquid is 100 μS/cm or more and may be 150 μS/cm or more, 200 μS/cm or more, 250 μS/cm or more, 300 μS/cm or more, 350 μS/cm or more, or 400 μS/cm or more. Also, the electrical conductivity may be 1000 μS/cm or less and is, for example, 900 μS/cm or less, 800 μS/cm or less, 700 μS/cm or less, or 600 μS/cm or less.

The maintenance liquid with an electrical conductivity of 100 μS/cm or more tends to be more detectable with the sensor. Also, the maintenance liquid with an electrical conductivity of 1000 μS/cm or less is less likely to attack the printing apparatus and tends to reduce the likelihood of clogging the waste flow path.

The electrical conductivity may be measured by, for example, but not limited to, using a conductivity meter ES-51 manufactured by HORIBA, Ltd. The electrical conductivity is measured at 25° C. The electrical conductivity of the maintenance liquid can be controlled by varying the amount of ions in the maintenance liquid. Ions can be added to the maintenance liquid using any of inorganic alkalis, ethylenediaminetetraacetic acid compounds, organic acids, organic alkalis, and the like.

1. 7. pH

The pH of the maintenance liquid is 6.0 or more and may be 6.3 or more, 6.6 or more, 6.9 or more, 7.0 or more, or 7.2 or more. Also, the pH is 11 or less and may be 10.5 or less, 10 or less, 9.5 or less, 9.0 or less, or 8.5 or less.

The maintenance liquid with a pH of 6.0 or more is less likely to attack the printing apparatus and tends to help recovery from clogging and reduce the likelihood of producing foreign matter. Also, the maintenance liquid with a pH of 11 or less is less likely to attack the printing apparatus and tends to reduce the change in composition with time.

The pH can be controlled by varying the amounts of the inorganic alkali, ethylenediaminetetraacetic acid compound, organic acid, organic alkali, and the like.

2. Ink

The ink for which the maintenance liquid of the embodiment is used may be, but is not limited to, an aqueous ink containing a coloring material.

2. 1. Coloring Material

Examples of the coloring material include, but are not limited to, azo pigments, such as azo lake, insoluble azo pigments, condensed azo pigments, and chelate azo pigments; polycyclic pigments, such as phthalocyanine pigments, perylene pigments, perinone pigments, anthraquinone pigments, quinacridone pigments, dioxazine pigments, thioindigo pigments, isoindolinone pigments, and quinophthalone pigments; other organic pigments such as nitro pigments, nitroso pigments, and aniline black; carbon blacks, such as furnace black, thermal lamp black, acetylene black, and channel black; inorganic pigments, such as metal oxides, metal sulfides, and metal chlorides; and extender pigments, such as calcium carbonate and talc.

The pigment may be dispersed in water with a dispersant, or the pigment may be self-dispersible pigment to which hydrophilic groups are introduced to the surfaces of the pigment particles by a chemical reaction, and such particles are dispersed in water. Alternatively, the pigment may be coated with a polymer, and such a polymer-coated pigment may be dispersed in water. In some embodiments, the thus prepared pigment dispersion liquid is added to the ink.

The pigment and the dispersant used in the pigment dispersion liquid may each be an individual substance or a combination of two or more substances.

The amount of the coloring material, in terms of solid, may be 0.5% to 15% by mass relative to the total mass of the ink and is, for example, 1.0% to 12% by mass, 2.0% to 10% by mass, or 3.0% to 7.5% by mass.

2. 2. Inorganic Oxide Particles

The aqueous ink of the embodiment may contain inorganic oxide particles. Such an aqueous ink tends to produce prints that exhibit good color development and improved stacking neatness. When the ink contains a substance that can be unstabilized in the ink by pH changes, such as pigment or resin, foreign matter may be produced by contacting a maintenance liquid with a pH outside the predetermined range, causing clogging of the nozzles or the waste tank. In particular, inks containing inorganic oxide particles tend to cause the inorganic particles to aggregate when contacting the maintenance liquid, notably producing foreign matter. In such a case, the maintenance liquid of the embodiment is more useful.

Examples of inorganic oxide particles include, but are not limited to, particles of silica, alumina, titania, zirconia, antimony oxide, tin oxide, tantalum oxide, zinc oxide, cerium oxide, lead oxide, and indium oxide. In some embodiments, silica particles may be used. Such inorganic oxide particles are effective in reducing curling of the resulting print. The inorganic oxide particles may be those of an individual substance or a combination of two or more substances.

The amount of the inorganic oxide particles, in terms of solid, may be 0.5% to 15% by mass relative to the total mass of the ink and is, for example, 1.0% to 12% by mass or 3.0% to 10% by mass. The ink containing 0.5% by mass or more of inorganic oxide particles tends to produce prints with highly developed color, reduced curls and cockles, and improved stacking neatness. Also, the ink containing 15% by mass or less of inorganic oxide particles tends to help recovery from clogging. The volume average particle size (D50) of the inorganic oxide particles may be 70 nm or less and is, for example, 10 nm to 50 nm or 20 nm to 40 nm. The volume average particle size (D50) mentioned herein is measured by a laser diffraction/scattering method. When the volume average particle size (D50) of the inorganic oxide particles is 70 nm or less, the ink is more effective in recovery from clogging. When the volume average particle size (D50) of the inorganic oxide particles is 10 nm or more, the ink is more effective in improving stacking neatness and color development.

2. 3. Water

The ink used in the embodiment may be an aqueous ink containing water. The water content may be 50% by mass or more relative to the total mass of the ink and is, for example, 55% by mass or more, 60% by mass or more, 65% by mass or more, or 70% by mass or more. Also, the water content may be 99% by mass or less relative to the total mass of the ink and is, for example, 90% by mass or less, 85% by mass or less, or 80% by mass or less.

2. 4. Water-Soluble Organic Solvent

The ink used in the embodiment may contain a water-soluble organic solvent. The water-soluble organic solvent in the ink tends to further increase the storage stability.

The water-soluble organic solvent may be one that can be used in the maintenance liquid and is, for example, a polyol or a monool. Examples of such a water-soluble organic solvent include, but are not limited to, glycerin; glycols, such as ethylene glycol, diethylene glycol, triethylene glycol, propylene glycol, dipropylene glycol, tripropylene glycol, propanediol, butanediol, pentanediol, and 1,2-hexanediol; and glycol monoalkyl ethers, such as ethylene glycol monomethyl ether, diethylene glycol monomethyl ether, triethylene glycol monomethyl ether, diethylene glycol monoethyl ether, diethylene glycol monobutyl ether, and triethylene glycol monobutyl ether.

The amount of the water-soluble organic solvent may be 1.0% by mass or more relative to the total mass of the ink and is, for example, 2.5% by mass or more, 5.0% by mass or more, 7.5% by mass or more, or 10% by mass or more. Also, the amount of the water-soluble organic solvent may be 30% by mass or less relative to the total mass of the ink and is, for example, 25% by mass or less, 20% by mass or less, or 15% by mass or less.

2. 5. Lactam

The ink used in the embodiment may contain a lactam, and examples of lactams include, but are not limited to, ε-caprolactam, 2-pyrrolidone, N-methylpyrrolidone, and 1-(2-hydroxyethyl)-2-pyrrolidone.

The amount of the lactam may be 1.0% by mass or more, for example, 2.0% by mass or more, relative to the total mass of the ink. Also, the amount of the lactam may be 7.5% by mass or less, for example, 5.0% by mass or less, relative to the total mass of the ink. Lactams that are liquid by themselves at room temperature are organic solvents.

2. 6. Resin Emulsion

The ink used in the embodiment may further contain resin emulsion. The resin emulsion may be, but is not limited to, urethane resin emulsion or (meth)acrylic resin emulsion. Such resin emulsion tends to be effective in reducing bleeding in the printed image and increasing the color development and rub resistance of the image. The resin emulsion may be an individual resin emulsion or a combination of two or more resin emulsions.

The urethane resin in the urethane resin emulsion has a urethane bond in the molecule and is not otherwise limited. For example, the urethane resin may be polyether-type urethane resin having an ether bond in the main chain, a polyester-type urethane resin having an ester bond in the main chain, or a polycarbonate-type urethane resin having a carbonate linkage in the main chain. In an embodiment, anionic urethane resin fine particles may be used.

The acrylic resin in the acrylic resin emulsion may be, but is not limited to, a polymer produced by polymerizing monomers such as (meth)acrylic acid or (meth)acrylic acid esters or a copolymer, such as styrene-acrylic resin, produced by copolymerizing (meth)acrylic monomers and other monomers. In an embodiment, anionic acrylic resin fine particles may be used.

The amount of resin emulsion may be 0.1% to 7.5% by mass relative to the total mass of the ink and is, for example, 0.2% to 5.0% by mass or 0.3% to 3.0% by mass. The ink containing 0.1% by mass or more of resin emulsion tends to reduce bleeding in the resulting image and further increase the rub resistance of the image. Also, when the amount of resin emulsion is 7.5% by mass or less, the ink tends to be more consistently ejected.

2. 7. Surfactant

The ink used in the embodiment may contain a surfactant. The surfactant may be, but is not limited to, an acetylene glycol-based surfactant, a fluorosurfactant, or a silicone surfactant. In particular, an acetylene glycol-based surfactant may be used from the viewpoint of recovery from clogging.

The acetylene glycol-based surfactant may be, but is not limited to, at least one selected from the group consisting of 2,4,7,9-tetramethyl-5-decyne-4,7-diol and alkylene oxide adducts thereof, and 2,4-dimethyl-5-decyne-4-ol and alkylene oxide adducts thereof. The acetylene glycol-based surfactant is commercially available, and examples thereof include, but are not limited to, Olfine 104 series and Olfine E series, such as Olfine E1010 and Olfine EXP. 4300 (all produced by Air Products and Chemicals Inc.); and Surfynol series 61, 104, and 465 (all produced by Evonik Industries). Such acetylene glycol-based surfactants may be used individually or in combination.

Examples of the fluorosurfactant include, but are not limited to, perfluoroalkylsulfonic acid salts, perfluoroalkylcarboxylic acid salts, perfluoroalkylphosphoric acid esters, perfluoroalkylethylene oxide adducts, perfluoroalkylbetaines, and perfluoroalkylamine oxides.

The silicone surfactant may be a polysiloxane compound or a polyether-modified organosiloxane.

The surfactant content may be 0.1% to 5.0% by mass, for example, 0.2% to 3.0% by mass, relative to the total mass of the ink. When the surfactant content is in such a range, the ink is more likely to help recovery from clogging.

2. 8. pH Adjuster

The ink may contain a pH adjuster, and examples include, but are not limited to, alkanolamines, such as diethanolamine, triethanolamine, dimethylethanolamine, and diethylethanolamine; alkali metal hydroxides, such as lithium hydroxide, sodium hydroxide, and potassium hydroxide; ammonium hydroxide; alkali metal carbonates, such as lithium carbonate, sodium carbonate, and potassium carbonate; and aminosulfonic acids, such as taurine.

The pH adjuster content may be 0.1% to 3.0% by mass, for example, 0.2% to 2.0% by mass, relative to the total mass of the ink.

2. Ink Set

In the embodiment, an ink set including the above-described maintenance liquid and the above-described ink is used. Also, the ink set may include the maintenance liquid and an ink used for printing with an ink jet head to be maintained with the maintenance liquid.

3. Maintenance Method

The maintenance method of the embodiment includes maintaining an ink jet head with the above-described maintenance liquid and detecting the electrical conductivity of the maintenance liquid with a conductivity-based sensor.

The maintenance method of the embodiment may further include an ejection step of ejecting the ink onto a printing medium using a predetermined ink jet head before the maintenance of the ink jet head.

3. 1. Ejection Step

In the ejection step, the ink is ejected from the ink jet head onto a printing medium. More specifically, the ink in the pressure-generating chamber of the ink jet head is ejected through nozzles by the operation of the pressure-generating device provided in the ink jet head. Such a way of ejection is also referred to as an ink jet method.

The ink jet head used in the ejection step may be a line head used for line printing or a serial head used for serial printing.

For line printing with a line head, for example, the printing head having a width more than or equal to the width of the printing medium is fixed to the printing apparatus. While the printing medium is moved in a sub-scanning direction (medium transport direction), ink droplets are ejected through the nozzles of the ink jet head in conjunction with the movement of the printing medium, thus printing an image on the printing medium.

For serial printing with a serial head, an ink jet head is mounted on or in a carriage capable of moving across the width of the printing medium. While the carriage is moved in a main scanning direction (width direction of the printing medium), the ink jet head ejects ink droplets through the nozzles of the ink jet head in conjunction with the movement of the carriage, thus printing an image on the printing medium.

3. 2. Maintenance Step

In the maintenance step, the ink jet head is maintained with the maintenance liquid. The maintenance of the ink jet head may be performed by, but not limited to, moisturizing the nozzle face or cleaning the printing apparatus. For cleaning the printing apparatus, for example, the maintenance liquid is attached to the nozzle face, which may be wiped with a wiper if necessary, or the maintenance liquid is allowed to flow in the ink jet head or through the ink flow paths to wash.

For moisturizing the nozzle face, for example, the maintenance liquid is indirectly applied to the nozzle face. For this operation, the maintenance liquid may be, for example, fed to the cap covering the nozzle face of the ink jet head and moisturize the closed space defined by the nozzle face and the cap without contact with the nozzle face, as described above.

Alternatively, the maintenance liquid may be directly applied onto the nozzle face to moisturize the nozzle face. This is a moisturizing technique of, for example, attaching the maintenance liquid directly to the nozzle face.

3. 3. Electrical Conductivity Detection Step

In the step of detecting the electrical conductivity, a conductivity-based sensor detects the electrical conductivity of the maintenance liquid. The conductivity-based sensor is located in a tank holding the maintenance liquid. The liquid level of the tank may be determined from the electrical conductivity measured with the sensor. For example, conductivity-based sensors are located at predetermined liquid level positions so that each sensor can detect the electrical conductivity, thus checking whether the maintenance liquid is present up to the liquid level at which the sensor detects the electrical conductivity.

When the electrical conductivity of the maintenance liquid is not detected or when a small amount of the maintenance liquid is determined from the detected electrical conductivity of the maintenance liquid, water may be added to the maintenance liquid from a water tank. Alternatively, the maintenance liquid may be supplied to the tank holding the maintenance liquid from the maintenance liquid container.

4. Printing Apparatus

The printing apparatus includes, for example, an ink jet head having nozzles through which an ink jet ink is ejected onto a printing medium, and a transport device to transport the printing medium. The ink jet head includes a pressure chamber to which the ink is supplied, and nozzles through which the ink is ejected. The ink jet head is subject to maintenance with the maintenance liquid. The transport device includes a transport roller and a transport belt that are located in the printing apparatus.

Furthermore, the printing apparatus used in the embodiment includes a conductivity-based sensor used for detecting the electrical conductivity of the maintenance liquid. The printing apparatus used in the embodiment may also include a feed mechanism to feed the maintenance liquid. The feed mechanism may have a water feed mechanism configured to add water to the maintenance liquid.

4. 1. Printing Medium

The printing medium used in the embodiment may be absorbent, poorly absorbent, or not absorbent and is not limited.

Absorbent printing media include, but are not limited to, plain paper, such as electrophotographic paper that is highly permeable to ink; and ink jet paper (ink jet specialized paper having an ink-absorbent layer made of silica particles or alumina particles or an ink-absorbent layer of a hydrophilic polymer, such as polyvinyl alcohol (PVA) or polyvinyl pyrrolidone (PVP)).

Poorly absorbent printing media include, but are not limited to, art paper, coated paper, and cast-coated paper that are used in ordinary offset printing.

Non-absorbent printing media include, but are not limited to, plastic films or plates, such as those of polyvinyl chloride, polyethylene, polypropylene, polyethylene terephthalate (PET), polycarbonate, polystyrene, and polyurethane; metal plates, such as those of iron, silver, copper, and aluminum; metal plates or plastic films on which such a metal is deposited; alloy plates made of stainless steel, brass, or the like; and paper sheets coated with (bonded to) a plastic film, such as that of polyvinyl chloride, polyethylene, polypropylene, polyethylene terephthalate (PET), polycarbonate, polystyrene, or polyurethane.

EXAMPLES

The present disclosure will be further described in detail with reference to Examples and Comparative Examples. However, the implementation of the concept of the present disclosure is not limited to the following Examples.

1. Preparation Examples of Ink

Materials for each ink composition presented in Table 1 were placed into a mixing tank, followed by mixing and stirring, and the mixture was filtered through a membrane filter. Thus, the ink jet inks of the Examples were prepared. The constituent values in the Table are expressed as a percentage by mass unless otherwise noted. The values for the inorganic oxide particles, pigment dispersion liquid, and resin are their solid contents in mass percent.

TABLE 1

| | | Ink | | | | | |
|---|---|---|---|---|---|---|---|
| | | Ink A | Ink B | Ink C | Ink D | Ink E | Ink F |
| Pigment dispersion liquid | Yellow Pigment CAB-O-JET 470Y | 6.0 | 6.0 | 6.0 | 6.0 | 6.0 | 6.0 |
| Inorganic oxide particles | Silica Cataloid SI-30 (D50: 30 nm) | 3.0 | — | 3.0 | 7.0 | 3.0 | 3.0 |
| Water-soluble organic solvent | Glycerin | 5.0 | 5.0 | 5.0 | 5.0 | 5.0 | 5.0 |
| | Triethylene glycol | 3.0 | 3.0 | 3.0 | 3.0 | 3.0 | 3.0 |
| | Triethylene glycol monobutyl ether | 1.0 | 1.0 | 1.0 | 1.0 | 1.0 | 1.0 |
| | Triethylene glycol monomethyl ether | 2.0 | 2.0 | 2.0 | 2.0 | 2.0 | 2.0 |
| | 1,2-Hexanediol | 0.3 | 0.3 | 0.3 | 0.3 | 0.3 | 0.3 |

TABLE 1-continued

| | | Ink | | | | | |
|---|---|---|---|---|---|---|---|
| | | Ink A | Ink B | Ink C | Ink D | Ink E | Ink F |
| Lactam | 2-Pyrrolidone | — | — | — | — | 3.0 | — |
| | 1-(2-hydroxyethyl)-2-Pyrrolidone | — | — | — | — | — | 3.0 |
| | ε-Caprolactam | 3.0 | 3.0 | — | 3.0 | — | — |
| Resin | X-436 | 0.3 | 0.3 | 0.3 | 0.3 | 0.3 | 0.3 |
| Surfactant | Olfine E1010 | 0.5 | 0.5 | 0.5 | 0.5 | 0.5 | 0.5 |
| | Surfynol 104 | 0.3 | 0.3 | 0.3 | 0.3 | 0.3 | 0.3 |
| | Olfine EXP. 4300 | 0.1 | 0.1 | 0.1 | 0.1 | 0.1 | 0.1 |
| pH Adjuster | Triethanolamine | 0.3 | 0.3 | 0.3 | 0.3 | 0.3 | 0.3 |
| | Water | Balance | Balance | Balance | Balance | Balance | Balance |

Pigment Dispersion Liquid:
- Yellow pigment (CAB-O-JET 470Y, produced by Cabot Corporation)

Inorganic Oxide Particles:
- Cataloid SI-30 (a product of Cataloid series, produced by JGC Catalysts & Chemicals Ltd., average particle size: 30 nm)

Water-Soluble Organic Solvent:
- Glycerin
- Triethylene glycol
- Triethylene glycol monobutyl ether
- Triethylene glycol monomethyl ether
- 1,2-Hexanediol Lactam:
- 2-Pyrrolidone
- 1-(2-Hydroxyethyl)-2-pyrrolidone
- ε-Caprolactam Resin:
- X-436 (styrene-acrylate resin emulsion, produced by Seiko PMC Corporation)

Surfactant:
- Olfine E1010 (acetylene glycol-based surfactant, produced by Nissin Chemical Co., Ltd.)
- Surfynol 104 (acetylene glycol-based surfactant, produced by Evonik Industries)
- Olfine EXP. 4300 (acetylene glycol-based surfactant, produced by Nissin Chemical Co., Ltd.) pH Adjuster:

Triethanolamine

2. Preparation Examples of Maintenance Liquid

Materials for each maintenance liquid composition presented in Table 2 were placed into a mixing tank, followed by mixing and stirring, and the mixture was filtered through a membrane filter. Thus, the maintenance liquids of the Examples were prepared. The constituent values in the Table are expressed as a percentage by mass unless otherwise noted.

TABLE 2

| | | Maintenance liquid | | | | | | | | | |
|---|---|---|---|---|---|---|---|---|---|---|---|
| | | Liquid A | Liquid B | Liquid C | Liquid D | Liquid E | Liquid F | Liquid G | Liquid H | Liquid I | Liquid J |
| Water-soluble organic solvent | Glycerin | 25 | — | — | 25 | 25 | 25 | 25 | 25 | 25 | 25 |
| | Triethylene glycol | — | 25 | — | — | — | — | — | — | — | — |
| | Propylene glycol | — | — | 25 | — | — | — | — | — | — | — |
| Component A | EDTA 2Na dihydrate | 0.06 | 0.06 | 0.06 | 0.06 | 0.06 | — | — | 0.06 | 0.06 | 0.06 |
| | Potassium hydroxide | 0.02 | 0.02 | 0.02 | — | — | 0.02 | — | 0.02 | — | 0.01 |
| | Sodium hydroxide | — | — | — | 0.02 | — | — | — | — | — | — |
| Component B | Triethanolamine | — | — | — | — | 0.3 | — | 0.3 | — | — | — |
| | Adipic acid | 0.02 | 0.02 | 0.02 | 0.02 | — | 0.02 | — | — | — | — |
| Preservative | Proxel XL2 | 0.3 | 0.3 | 0.3 | 0.3 | 0.3 | 0.3 | 0.3 | 0.3 | 0.3 | 0.3 |
| Water | | Balance | Balance | Balance | Balance | Balance | Balance | Balance | Balance | Balance | Balance |
| Total | | 100 | 100 | 100 | 100 | 100 | 100 | 100 | 100 | 100 | 100 |
| Property | Electrical conductivity [μS/cm] | 460 | 460 | 460 | 500 | 240 | 350 | 20 | 470 | 180 | 300 |
| | pH | 7.4 | 7.5 | 7.7 | 10.1 | 8.9 | 10.4 | 10.1 | 11.9 | 5.1 | 9.5 |

Water-Soluble Organic Compound:

Glycerin

Triethylene glycol

Propylene glycol

Component A:

Disodium dihydrogen ethylenediaminetetraacetate dihydrate (EDTA 2Na dihydrate)

Potassium hydroxide

Sodium hydroxide

Component B:

Triethanolamine (liquid at room temperature)

Adipic acid (solid at room temperature)

Preservative:

Proxel XL2 (produced by Arxada AG)

2. 1. pH Measurement

The pH of the ink was measured with a benchtop pH meter (Model F-72, manufactured by HORIBA, Ltd.) The measurement temperature was 25° C.

2. 2. Electrical Conductivity Measurement

The electrical conductivity was measured with a conductivity meter ES-51 (manufactured by HORIBA, Ltd.) The measurement temperature was 25° C.

3. Evaluation 3. 1. Maintenance Liquid Level Detectability with Sensor

The electrical conductivity of each maintenance liquid was measured, and the degree of level detectability with the sensor was rated according to the following criteria:

A: 250 μS/cm or more

B: 100 μS/cm or more

C: less than 100 μS/cm 3. 2. Maintenance Liquid Attacking Likelihood on Apparatus Members An aluminum member of the printing apparatus that is to contact liquid was immersed in the maintenance liquid and allowed to stand at 70° C. for 6 days. After the 6-day immersion, the appearance of the aluminum member was visually observed to check for some change before and after immersion. The likelihood of attacking was rated according to the following criteria:

A: No change in appearance

B: Abnormal appearance (corrosion)

3. 3. Change with Time in Composition of Maintenance Liquid (pH Change)

An amount of the maintenance liquid was removed into a vessel, and the vessel open was allowed to stand at room temperature for 7 days. After standing for 7 days, the amount of water equivalent to that evaporated was supplied to the vessel, and then, the pH in the vessel was measured. The change in composition was estimated based on the difference between the pH before standing and the pH after standing and rated according to the following criteria:

A: pH difference was less than 0.7

B: pH difference was from 0.7 to less than 1.3.

C: pH difference was 1.3 or more 3. 4. Recovery from Clogging

The ink cartridge of an ink jet printer PX-S7050 was filled with the ink, and it was confirmed that the ink was ejected through all nozzles. Then, each maintenance liquid was supplied to the cap, and the nozzle face was covered with the cap to form a closed space therebetween without contact with the maintenance liquid in the cap. In this state, the nozzles were allowed to stand at a temperature of 40° C. and a humidity of 20% for 7 days.

After standing for 7 days, the ink jet head was cleaned by suction. The number of nozzles that failed ink ejection was counted every suction, and cleaning was repeated until all the nozzles recovered. The recovery from clogging was rated according to the following criteria based on the number of times of cleaning.

Criteria:

AA: All nozzles recovered by cleaning once.

A: All nozzles recovered by cleaning two or three times.

B: All nozzles recovered by cleaning four or five times.

C: All nozzles recovered by cleaning six times.

D: The nozzles did not recover even by cleaning six times.

3. 5. Likelihood of Clogging Waste Flow Path

An amount of the maintenance liquid was removed into a vessel, and the vessel open was allowed to stand at room temperature for 7 days. After standing for 7 days, the amount of water equivalent to that evaporated was supplied to the vessel, and then, the maintenance liquid and the ink were mixed in a mass ratio of 1:1. Then, 10 mL of the resulting mixture was passed through a filter, and the filter was visually checked for clumps formed on the filter. The likelihood of clogging the waste flow path was thus rated according to the following criteria:

A: No foreign matter

B: A very small amount of foreign mater occurred.

C: Foreign matter occurred.

3. 6. Color Development of Print

The ink jet cartridge of an ink jet printer PX-S7050 (manufactured by Seiko Epson Corporation) was filled with each ink prepared above. An A4 (210 mm×297 mm) sheet of copy paper "Xerox P" (manufactured by Fuji Xerox, having a basis weight of 64 g/m$^2$ and a thickness of 88 μm) was prepared as a printing medium. A solid pattern was printed on the printing medium at a printing duty of 100%. After printing, the optical density (OD value) of the printed pattern was measured with a colorimeter Xrite i1 (manufactured by Xrite), and the color development was rated according to the following criteria:

A: The largest OD value was 1.00 or more.

B: The largest OD value was 0.95 to less than 1.00.

C: The largest OD value was 0.90 to less than 0.95.

D: The largest OD value was less than 0.90.

3. 7. Printed Sheet Stacking Neatness

The same solid pattern as formed for evaluating the color development of prints was continuously printed on 20 sheets of the printing medium, over the entire printable area, with the ink jet printing apparatus used for the evaluation of the color development of prints, and the neatness of the stack of ejected sheets was rated according to the following criteria:

A: The sheets were aligned enough to be stapled (fit in place with each side aligned neatly)

B: 20 sheets were stacked but not aligned (fit in place with misaligned sides)

C: 20 sheets were not in a stack (some sheets protruding from the tray)

| | Example | | | | | | | | | | | Comparative Example | | | | | | Reference Example |
|---|---|---|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 | 5 | 6 | 1 |
| Maintenance liquid | Liquid A | Liquid B | Liquid C | Liquid D | Liquid E | Liquid A | Liquid A | Liquid A | Liquid F | Liquid A | Liquid A | Liquid G | Liquid H | Liquid I | Liquid H | Liquid G | Liquid J | — |
| Ink | Ink A | Ink A | Ink A | Ink A | Ink A | Ink B | Ink C | Ink D | Ink A | Ink E | Ink F | Ink A | Ink A | Ink A | Ink B | Ink C | Ink A | Ink A |
| Maintenance liquid level detectability with sensor | A | A | A | A | B | A | A | A | A | A | A | C | A | B | A | C | A | — |
| Maintenance liquid attacking likelihood on apparatus members | A | A | A | A | A | A | A | A | A | A | A | A | B | B | B | A | A | — |
| Change with time in composition of maintenance liquid (pH Change) | A | A | B | A | B | A | A | A | B | A | A | B | C | B | C | B | C | — |
| Recovery from clogging | A | B | B | A | A | AA | B | B | A | A | A | A | C | C | B | B | B | D |
| Likelihood of clogging waste flow path | A | A | A | A | A | A | A | A | A | A | A | A | C | C | B | A | C | A |
| Color development of print | A | A | A | A | A | B | B | A | A | B | B | A | A | A | B | A | A | A |
| Printed sheet stacking neatness | B | B | B | B | B | C | B | A | B | B | B | B | B | B | C | B | B | B |

4. Evaluation Results

The maintenance liquid used in Comparative Examples 1 and 5 did not contain component A. This liquid was inferior in detectability with the sensor. The maintenance liquids used in In Comparative Examples 2, 3, and 6 did not contain component B. These liquids were more likely to change in the composition of the maintenance liquid and clog the waste flow path. Additionally, recovery from clogging was not sufficient.

In contrast, Examples 1 to 11 used specific maintenance liquids. These liquids were superior in detectability with the sensor and reducing clogging in the waste flow path, exhibited good recovery from clogging, and were less likely to attack apparatus members and change in the composition. In the Reference Example, which did not use any maintenance liquid, recovery from clogging was insufficient when the nozzle face was moisturized.

What is claimed is:

1. A printing apparatus comprising:

an ink jet head configured to eject an ink for printing;

a maintenance liquid configured to maintain the ink jet head, the maintenance liquid being aqueous and subject to detection by a conductivity-based sensor, and the maintenance liquid comprising at least one selected from the group consisting of inorganic alkalis and ethylenediaminetetraacetic acid compounds, and at least one selected from the group consisting of organic acids and organic alkalis; and a conductivity-based sensor configured to detect an electrical conductivity of the maintenance liquid, wherein the electrical conductivity of the maintenance liquid is 100 μS/cm or more, and a pH of the maintenance liquid is 6.0 to 11.

2. The printing apparatus according to claim 1, further comprising a water-soluble organic compound.

3. The printing apparatus according to claim 2, wherein the water-soluble organic compound includes an organic solvent that is a polyol.

4. The printing apparatus according to claim 2, wherein an amount of the water-soluble organic compound is 1.0% to 30% by mass relative to a total mass of the maintenance liquid.

5. The printing apparatus according to claim 1, wherein the at least one selected from the group consisting of organic acids and organic alkalis is solid at 25° C.

6. The printing apparatus according to claim 1, wherein the ink is an aqueous ink containing a coloring material.

7. The printing according to claim 6, wherein the ink contains inorganic oxide particles.

8. The printing apparatus according to claim 1, wherein the electrical conductivity is 250 μS/cm or more.

9. The printing apparatus according to claim 1, wherein a total amount of the inorganic alkalis and the ethylenediaminetetraacetic acid compounds is 0.01% to 0.1% by mass relative to a total mass of the maintenance liquid.

10. The printing according to claim 1, wherein a total amount of the organic acids and the organic alkalis is 0.01% to 0.5% by mass relative to a total mass of the maintenance liquid.

11. The printing apparatus according to claim 1, further comprising a preservative.

12. The printing apparatus according to claim 1, wherein the maintenance liquid is used for maintenance performed by being fed to a cap covering a nozzle face of the ink jet head to moisturize the nozzle face.

13. The printing apparatus according to claim 12, wherein the nozzle face and the cap define a closed space, and the maintenance liquid moisturizes the closed space without contact with the nozzle face.

14. A maintenance method using the printing apparatus according to claim 1 comprising:

maintaining the ink jet head using the maintenance liquid; and detecting the electrical conductivity of the maintenance liquid with the conductivity-based sensor.

15. The printing apparatus according to claim 1, further comprising a feed mechanism configured to feed the maintenance liquid, the feed mechanism including a water feed mechanism configured to add water to the maintenance liquid.

* * * * *